(12) United States Patent
Capozza

(10) Patent No.: US 10,984,613 B2
(45) Date of Patent: Apr. 20, 2021

(54) METHOD FOR ESTIMATING THE TRAVEL TIME OF A VEHICLE BASED ON THE DETERMINATION OF THE STATE OF THE VEHICLE

(71) Applicant: OCTO TELEMATICS S.p.A., Rome (IT)

(72) Inventor: Massimo Capozza, Rome (IT)

(73) Assignee: OCTO TELEMATICS S.P.A., Rome (IT)

( * ) Notice: Subject to any disclaimer, the term of this patent is extended or adjusted under 35 U.S.C. 154(b) by 185 days.

(21) Appl. No.: 16/312,613

(22) PCT Filed: Jun. 30, 2017

(86) PCT No.: PCT/IB2017/053950
§ 371 (c)(1),
(2) Date: Dec. 21, 2018

(87) PCT Pub. No.: WO2018/002891
PCT Pub. Date: Jan. 4, 2018

(65) Prior Publication Data
US 2019/0259224 A1 Aug. 22, 2019

(30) Foreign Application Priority Data

Jun. 30, 2016 (IT) .................. 102016000068144

(51) Int. Cl.
*G07C 5/08* (2006.01)
*B60W 40/10* (2012.01)
*G07C 5/02* (2006.01)

(52) U.S. Cl.
CPC ............. *G07C 5/085* (2013.01); *B60W 40/10* (2013.01); *G07C 5/02* (2013.01)

(58) Field of Classification Search
CPC .......... G07C 5/085; G07C 5/02; B60W 40/10
See application file for complete search history.

(56) References Cited

U.S. PATENT DOCUMENTS 6,832,141 B2 * 12/2004 Skeen ................... G07C 5/008
340/439
9,141,995 B1 * 9/2015 Brinkmann .............. G07C 5/02
(Continued)

FOREIGN PATENT DOCUMENTS

| EP | 2189948 A2 | 5/2010 |
| EP | 2343208 A1 | 7/2011 |
| EP | 2503516 A2 | 9/2012 |

*Primary Examiner* — Michael J Zanelli
(74) *Attorney, Agent, or Firm* — Arent Fox LLP; Michael Fainberg

(57) ABSTRACT

A method for estimating the travel time of a vehicle based on the determination of the state of the vehicle is described, including the recognition of a start-up event as a result of determining a transition from an inactive engine state or vehicle-at-rest state to an active engine state or running vehicle state; the recognition of an end of travel event as a result of the determination of a transition from an active engine state or vehicle running state to an inactive engine state or vehicle-at-rest state; the calculation of the travel time according to the time elapsed between the start of travel and the end of travel, wherein the two transitions are determined if, when running, it is determined that the active engine state or running vehicle state, respectively the inactive engine state or the vehicle-at rest state, is maintained unchanged for a predetermined hysteresis time interval.

9 Claims, 3 Drawing Sheets

(56) References Cited

U.S. PATENT DOCUMENTS

| | | | | |
|---|---|---|---|---|
| 9,269,202 B2* | 2/2016 | Phelan | ................. | B60W 40/09 |
| 2011/0095878 A1 | 4/2011 | Skaff et al. | | |
| 2016/0341559 A1* | 11/2016 | Camisa | ................. | G07C 5/085 |

* cited by examiner

METHOD FOR ESTIMATING THE TRAVEL TIME OF A VEHICLE BASED ON THE DETERMINATION OF THE STATE OF THE VEHICLE

CROSS-REFERENCE TO RELATED APPLICATIONS

This application is the U.S. National Stage Application of International Patent Application No. PCT/IB2017/053950, filed on Jun. 30, 2017, which claims priority to Italian Patent Application No. 102016000068144, filed on Jun. 30, 2016, the contents of each of which is incorporated herein by reference in its entirety.

FIELD OF THE INVENTION

The present invention relates to the automotive sector and specifically to the technical field of onboard devices for detecting data relating to the motion and driving parameters of a vehicle.

Specifically, the invention relates to a method for estimating the travel time of a vehicle based on the determination of the state of the vehicle.

STATE OF THE ART

Onboard detection devices are known, in particular for the real-time acquisition and remote transmission of motion and driving parameters of a vehicle, which not only contribute to the operation of onboard systems for driving assistance but are indispensable for the functionality of other auxiliary systems, including, for example, the vehicle's surveillance systems and dynamics recording systems, such as systems used in anti-theft devices, in monitoring devices for vehicles belonging to a fleet or in devices, known as black boxes, for detecting traffic offenses or road accidents dynamics, such as for law enforcement or insurance companies.

Typically, a system for monitoring and recording the dynamics of use of a vehicle is provided to detect the vehicle's driving conditions (driving speed, overall driving time, engine speed) in view of transmitting them to a remote analysis station. The data may be transferred periodically to the analysis station via an onboard communication system or simply recorded to an inviolable storage media available onboard the vehicle from where the data may be retrieved later, for example, when the vehicle is subjected to a scheduled periodic maintenance intervention.

In both cases described above, the surveillance system is designed to record, without distinction and continuously, every driving event and every interval of inactivity of the vehicle.

The state of the vehicle, that is, the condition of activity (in operation) or inactivity of the vehicle's engine, is important information because it is related to the vehicle's use or non-use events that represent important data in checking the conditions of use of a vehicle in the long run, for example in checking the operation of vehicles belonging to a fleet. In fact, in the event that the vehicle engine is in operation, it may be deduced that the vehicle is running ('running' meaning a driving condition of the vehicle, including temporary stops, but excluding prolonged parking) while in the case wherein the engine of a vehicle is not in operation it may be deduced that the vehicle is parked.

There are vehicles that from their production integrate onboard devices for the detection of motion and driving parameters to determine the state of the vehicle by means of a physical link with the ignition and key start switch device or the CAN bus of the vehicle. If these devices are not provided at the time of the vehicle's production, or if the vehicle is not equipped with a conventional ignition and key start switch device, it is not always possible or convenient (in terms of difficulty and reliability of the intervention) to make use of a physical link with the key signal or the CAN bus to determine the vehicle's state.

The detection of the start and the end of a vehicle trip, i.e. the determination of the vehicle travel time, is important information for certain applications. In some cases, such as when calculating the distance traveled by the vehicle, it is not important to know whether this distance has been traveled on a single trip or over two or more separate trips, provided that there is no loss of travel information as a result of the erroneous subdivision of a trip or erroneous merging of multiple trips. In other cases, particularly in the provision of vehicle fleet management services, accurate tracking of the start and the end of a trip is an essential aspect. The likelihood that a single trip will be treated as two separate trips, or that two separate trips will be treated as a single trip, is considered a primary performance indicator for assessing the efficiency and reliability of a control service of the use of a vehicle carried out by the use of onboard devices for detecting data relating to the motion and driving parameters of a vehicle.

Conventionally, the start of a trip corresponds to the transition from an inactive engine state or a vehicle-at-rest state (hereinafter, OFF state) to an active engine state or a running vehicle state (hereinafter, ON state), which may be determined by detecting a transition between corresponding states of the ignition and key start switch device of the vehicle.

The end of a trip, on the contrary, corresponds to the transition from an active engine state or a running vehicle state (ON state) to an inactive engine state or a vehicle-at-rest state (OFF state), which may be determined in a similar way.

The start and end of a trip may be accurately detected by means of onboard devices for detecting data relating to the motion and driving parameters of the vehicle, that are physically connected to a node of the vehicle's electrical system where there is a voltage if, and only if, the state of the ignition and startup shutdown switch device is indicative of an active engine or running vehicle state. Erroneous determinations of the vehicle's state may be due to human errors in the installation of the onboard device when the physical connection is made to a node of the vehicle's electrical system where the voltage value detected does not follow the state of the ignition and start switch device.

However, there are cases where onboard devices are installed that do not have a physical connection with the ignition and start switch device, because the vehicle installation is simpler or one wants to avoid possible operator errors when connecting to the vehicle's electric system. In this type of device, the state of the vehicle is determined (estimated) by detecting the movement of the vehicle or the voltage that is established across an electric charge accumulator assembly (battery) of the vehicle, used for starting the vehicle's thermal engine and/or for powering the vehicle's accessory devices and rechargeable by means of the kinetic energy of the engine.

The detection of a voltage value across the accumulator assembly above a known voltage value across the accumulator assembly at rest and the determination of the movement of a vehicle provide in combination reliable indicators of the state of the vehicle. However, the absence of the same indications does not allow one to deduce with certainty that the vehicle is inactive or at rest.

In fact, when a vehicle stops its operation for a short period of time, for example in respect of road signs or in traffic conditions or a traffic jam, the ignition and start switch remains in the driving condition, i.e. the vehicle is effectively in use, although signs of thermal engine activity may not be present. The vibrations of the thermal engine under travel stop conditions may be too small to be detected by vehicle dynamics sensors or may not be present at all when the vehicle is equipped with a so-called start/stop mechanism so that the thermal engine stops working when the vehicle is stationary for a short period of time, then resumes it when it starts travelling again.

SUMMARY OF THE INVENTION

The object of the present invention is to provide a method for accurately determining the travel time using an onboard device without physical connection to the ignition and start switch device of the vehicle, in particular a method for resolving the disadvantages described above.

According to the present invention, this object is achieved by a method for determining the travel time having the features as described and claimed herein.

Particular embodiments are the subject of the dependent claims, the content of which is to be understood as an integral part of the present description.

A further subject of the invention is an onboard device for detecting data relating to the motion and driving parameters of a vehicle and a computer program or group of programs executable by a processing system of an onboard device, as claimed.

In summary, the present invention is based on the principle of verifying whether the determination of the state of a vehicle, upon which the determination of the start or the end of a trip depends, obtained indirectly, for example by analyzing the voltage value that establishes across an accumulator assembly of a vehicle, by analyzing the vehicle dynamics data detected by accelerometer and/or gyroscopic sensors, or by analyzing the positioning data acquired by a geographical positioning system of the vehicle, is unchanged for a predetermined hysteresis time interval having the aim of filtering any possible anomalous events of detection of a spurious transition—because it is excessively short—from an active engine state or running vehicle state to an inactive engine state or vehicle-at-rest state, or vice versa.

Advantageously, an optimal hysteresis time interval is determined by an analysis of the error probabilities depending upon a selection of a hysteresis time interval.

Further features and advantages of the invention will be described in greater detail in the following detailed description of one embodiment thereof, given by way of non-limiting example, with reference to the accompanying drawings concisely described in the subsequent paragraph.

DETAILED DESCRIPTION

Figure 1:
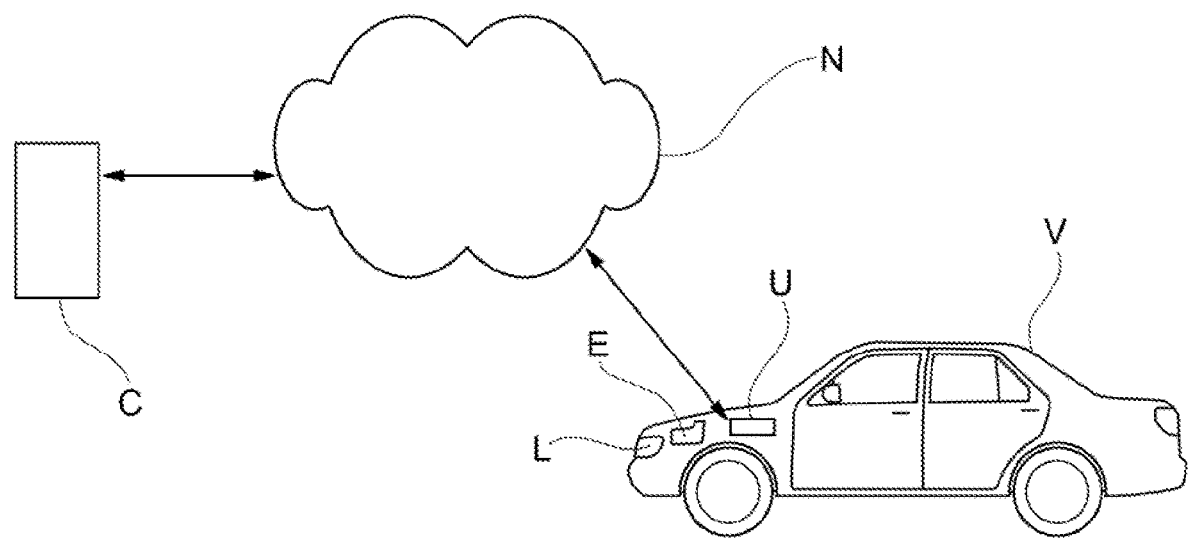
FIG. 1 is a schematic representation of the context of application of the present invention.

FIG. 1 shows the context of application of the present invention.

In FIG. 1, a generic vehicle is indicated at V, such as a private car or a vehicle belonging to a fleet of company vehicles. The vehicle V is equipped with a thermal engine E and an electric charge accumulator assembly, known simply as a battery, indicated at B, which controls the startup of the thermal engine and/or the power supply of the vehicle's accessories such as the lighting devices L, and is rechargeable by means of the kinetic energy of the engine, typically by means of an alternator A.

An onboard device for detecting data relating to the motion and driving parameters of the vehicle, in particular for the real-time acquisition and remote transmission of said data, is indicated at U. This device is arranged for processing data relating to motion and driving parameters of the vehicle and for transmitting said data to a central remote unit C, for example through a public telecommunication network N.

By way of example and for the objects of the present invention, the data relating to the motion and driving parameters of the vehicle are data indicative of the travel time of the vehicle. The travel time, calculated from a detected travel start time to a detected travel end time, is a useful item of data—for example—for checking the conditions of use of a vehicle and possibly for the provision of various services related to the use of a vehicle.

Conventionally, the travel start time is detected at a transition of the state of the vehicle from an inactive or rest state (hereinafter referred to as OFF) to a condition of activity or running (hereinafter referred to as ON). Likewise, the travel end time is detected at a transition of the state of the vehicle from an active or running state (ON) to an inactive or rest state (OFF).

Figure 2:
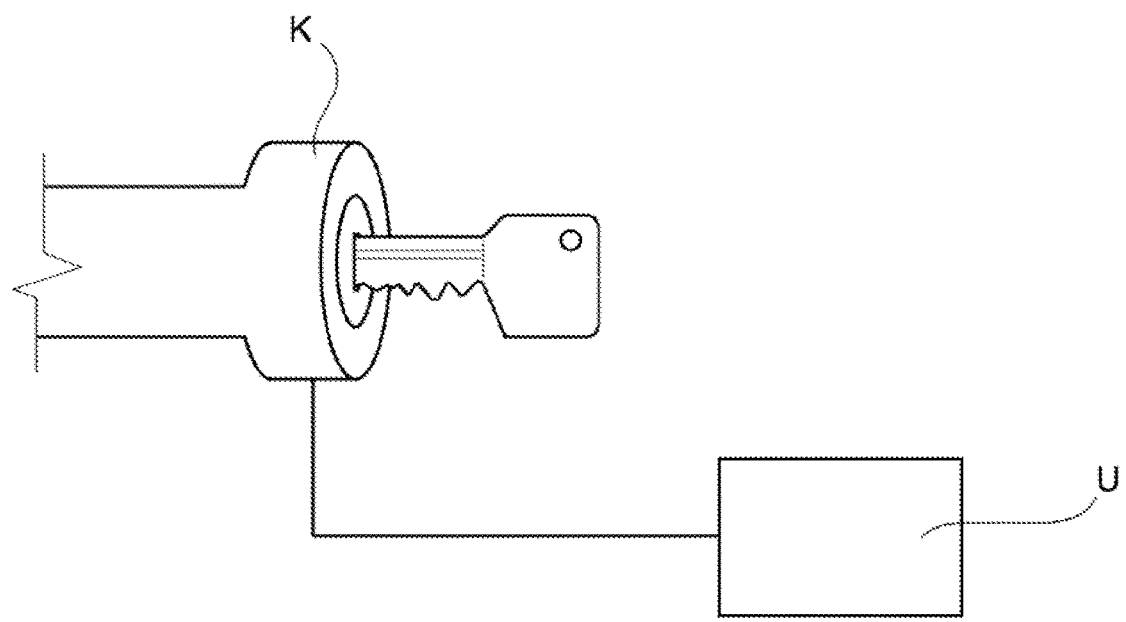
FIG. 2 is a schematic representation of a coupling configuration onboard a vehicle of a device for detecting data relating to the motion and driving parameters of a vehicle by means of a physical link to the ignition and key start switch device of the vehicle, according to the prior art.

FIG. 2 shows a typical configuration of the prior art of a coupling on board a vehicle of a device for detecting data relating to motion and driving parameters of the vehicle in order to determine the state of the vehicle.

In the known configuration, the onboard device U is physically connected through dedicated wiring to an ignition and key start switch device K of the vehicle or to a similar node of the electrical system of the vehicle wherein an electrical voltage is present if, and only if, the vehicle key is turned to the activation position, and the vehicle (the engine and its accessories) is electrically powered by the charging battery.

Figure 3:
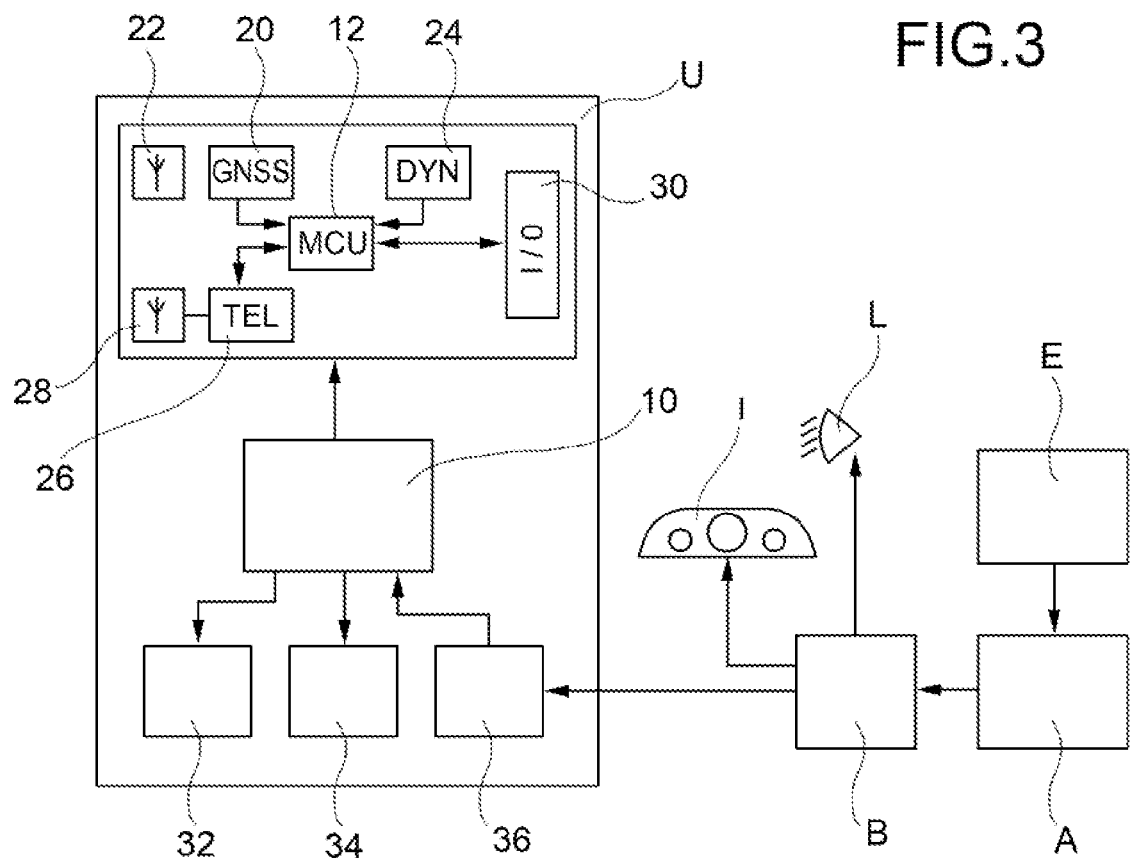
FIG. 3 is a functional block diagram of an illustrative, non-limiting embodiment of an onboard device for detecting data relating to the motion and driving parameters of a vehicle coupled to an electric charge accumulator assembly of the vehicle according to the invention.

FIG. 3 shows an illustrative block diagram in greater detail of an onboard device U according to the invention in the coupling configuration on board the vehicle of the present invention.

The onboard device U includes a microprocessor 10 arranged for the acquisition and processing of data relating to the motion and driving parameters of the vehicle, acquired through an acquisition section, for example comprising a microcontroller 12 connected to a geographical positioning system 20, shown in the figure in association with its antenna 22, to a vehicle dynamics detection system 24, for example a system including one or more sensors such as position, tilt or acceleration sensors, arranged to provide accurate information on the positioning and orientation of the vehicle in space and on its displacement dynamics, and to a communication module 26, shown in the figure in association with the relative antenna 28, adapted to exchange data to and from the telecommunication network N.

The onboard device U also includes an input and output interface 30 connected to the microcontroller 12 for connection to an onboard communication network of the vehicle, as in a purely non-limiting and non-exclusive example a CAN network, and to remote communication modules 32, 34, such as Wi-Fi or Bluetooth communication modules, for connecting the microprocessor 10 to auxiliary devices, for example used to authenticate the vehicle's driver and/or to inhibit the startup of the vehicle when the driver is not authenticated.

The figure also shows a physical connection module 36 for connection to an electric charge accumulator assembly B of the vehicle, capable of bringing to the microprocessor a signal indicative of the voltage value that is established across the accumulator assembly.

For the sake of completeness in representation, the accumulator assembly B is shown in conjunction with a charge alternator A, driven by the vehicle's thermal engine E, and in conjunction with some illustrative loads such as an instrument panel I of the vehicle or the headlights L of the vehicle.

Figure 4:
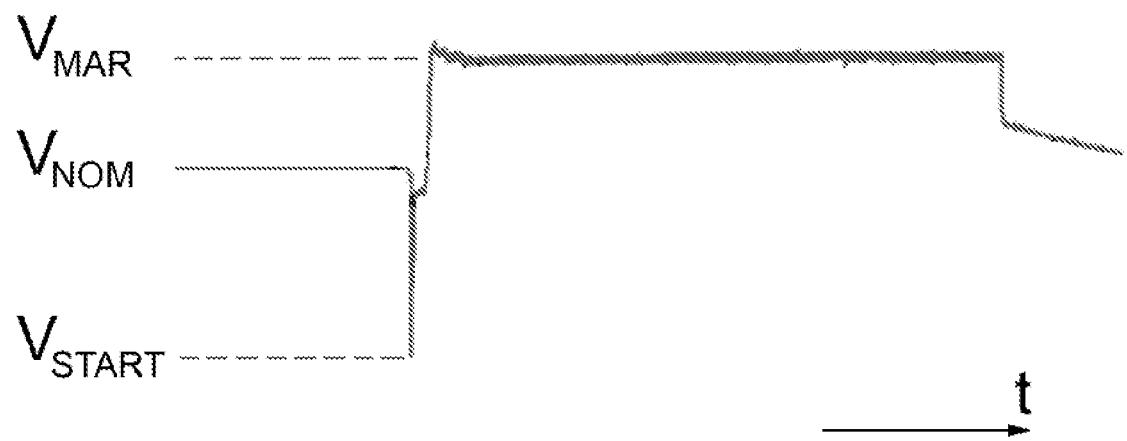
FIG. 4 is a diagram showing an illustrative trend over time of the voltage that establishes across an accumulator assembly used for starting a vehicle's thermal engine and/or for powering the vehicle's accessory devices and rechargeable by means of the kinetic energy of the engine, according to the aforementioned conditions.

FIG. 4 is a diagram showing an illustrative trend in time of the voltage that is established across an accumulator assembly B when it is used for starting a vehicle's thermal engine and/or for powering the vehicle's accessory devices, and is rechargeable by means of the kinetic energy of the engine E by means of the alternator A.

For an accumulator assembly having a nominal voltage $V_{NOM}$ of 12 V, the voltage value present across the assembly in a state of inactivity or rest of the vehicle is substantially equal to or slightly above the nominal voltage $V_{NOM}$. When starting the vehicle's thermal engine, a large amount of electrical energy is drained from the accumulator, and for a limited time, on the order of a fraction of a second, a sharp voltage drop is experienced across it, on the order of several volts, until reaching the value $V_{START}$. Subsequently, when the vehicle is running and the kinetic energy of the thermal engine is used to recharge the accumulator assembly via the alternator A, the value of the voltage across the accumulator is higher than the nominal value, e.g. on the order of about 2 volts, the average value being indicated as $V_{MAR}$, and affected by noise, until the vehicle's engine shuts off and returns to a state of inactivity (or rest), whereby the voltage across the accumulator decreases to the nominal value $V_{NOM}$.

The determination of the travel time of a vehicle is carried out by measuring the time between the start of travel, corresponding to the transition from an inactive engine state or a vehicle-at-rest state (hereinafter, OFF state) to an active engine state or a running vehicle state (hereinafter, ON state), and the end of travel, corresponding instead to the transition from an active engine state or running vehicle state (ON state) to an inactive engine state or a vehicle-at-rest state (OFF state).

According to the invention, a transition from an inactive engine state or a vehicle-at-rest state (OFF state) to an active engine state or a running vehicle state (ON state) is recognized as a trip start event if it is determined that the active engine state or running vehicle state is maintained unaltered for a predetermined hysteresis time interval.

Likewise, a transition from an active engine state or a running vehicle state (ON state) to an inactive engine state or a vehicle-at-rest state (OFF state) is recognized as an end of travel event if it is determined that the inactive engine state or vehicle-at-rest state is maintained unaltered for a predetermined hysteresis time interval.

The predetermined hysteresis time interval may have different values for each transition.

A possible error in determining the travel time that the present invention aims to avoid is related to the division of an actual single trip into a number of separate trips.

This error may occur when a vehicle stops running for a period of time longer than the hysteresis time interval, although its real state is ON for the whole period. This is the case, for example, for traveling vehicles that temporarily stop running in traffic, even by turning off the engine (start/stop system). In this case, a transition from the ON state to the OFF state may be erroneously detected even if it has not occurred. A subsequent transition from the OFF state to the ON state will be detected as soon as the vehicle's movement or engine activity is subsequently resumed. Therefore, an actual single trip (whereby, for example, the ignition and start key has never really been changed to the OFF position) is considered instead as two separate trips.

Another possible error in determining the travel time that the present invention aims to avoid is related to the combining of a plurality of actual separate trips into a single trip.

This error may occur when a vehicle actually stops its operation and ends a trip (whereby, for example, the ignition and start key is actually moved to the OFF position) but remains at rest for a period of time less than the hysteresis time interval.

In this case, a transition from the ON state to the OFF state—indicating the end of a trip—and a subsequent transition from the OFF state to the ON state—indicating the start of a separate trip—may erroneously be detected but not considered valid even though it actually took place. Therefore, two actual separate consecutive trips are considered as a single trip.

If the hysteresis time interval is set to a very low value, for example a few seconds, the frequency of errors in recognizing separate trips instead of an actual single trip will be very high since potentially any brief stop of the vehicle's operation would result in the determination of a transition from the ON state to the OFF state. Conversely, the frequency of errors in recognizing a single trip instead of actual separate trips will be greatly reduced, as potentially only separations of a few seconds between separate trips (rare in practice) may be erroneously ignored.

If the hysteresis time interval is set to a very high value, for example several minutes, the frequency of errors in recognizing separate trips instead of an actual single trip will be much reduced since potentially only prolonged stops of the vehicle's operation would result in the determination of a transition from the ON state to the OFF state. Conversely, the frequency of errors in recognizing a single trip instead of actual separate trips will be greatly increased as, potentially, separations of a few seconds between actual separate trips (rare in practice) may be erroneously ignored.

The following discusses the evaluation of the probability of occurrence of the above-described errors as a function of the hysteresis time interval in order to identify an optimal hysteresis time interval.

In the following description, a "temporary stop" of the vehicle shall mean a stop occurring without disabling the vehicle's engine, such as a stop of the vehicle's travel at a traffic light or in a traffic jam. Short and very slow movements, such as the movements needed when a vehicle advances in a traffic jam, are considered equivalent to temporary stops since the actual movement of the vehicle is substantially negligible. Furthermore, a "definitive stop" of the vehicle shall mean a vehicle stop carried out in conjunction with engine deactivation, such as parking the vehicle. A temporary stop is not the end of a trip; a definitive stop instead is the end of a trip.

Pr (t<T|s=final) indicates the conditional probability that a definitive stop (s=final) will last for a time interval t shorter than a predetermined reference time interval T.

Pr (t<T|s=temporary) indicates the conditional probability that a temporary stop (s=temporary) will last for a time interval t shorter than a predetermined reference time interval T.

Pr (s=final, t<T) indicates the joint probability that a stop is definitive (s=final) and that it will last for a time interval t shorter than a predetermined reference time interval T.

Pr (s=temporary, t<T) indicates the joint probability that a stop is temporary (s=temporary) and that it will last for a time interval t shorter than a predetermined reference time interval T.

$Pr(E_b, T)$ indicates the probability that an actual single trip will be subdivided into a plurality of (two) separate trips as a function of a predetermined hysteresis time interval T in the execution of an algorithm for determining the state of the vehicle.

$Pr(E_m, T)$ indicates the probability that a plurality of (two) actual separate trips will be merged into a single trip as a function of a predetermined hysteresis time interval T in the execution of an algorithm for determining the state of the vehicle.

Pr(E, T) indicates the probability that an actual single trip will be subdivided into a plurality of (two) separate trips and that a plurality of (two) actual separate trips will be merged into a single trip as a function of a predetermined hysteresis time interval T in the execution of an algorithm for determining the state of the vehicle.

According to the invention, a set of travel data acquired by a plurality of vehicles is considered, for example, more than 1,000 vehicles and preferably more than 10,000 vehicles, for a number of trips made exceeding 100,000 and preferably over 1,000,000, wherein said travel data are representative of the duration of trips made by the vehicles and the duration of the temporary stop and final stop intervals. For example, said travel data is acquired from onboard devices for detecting data relating to motion and driving parameters of a vehicle of the type described in the present invention, preferably associated with the ignition and key start switch device of the vehicles on which they are installed.

A large amount of travel data allows one to have a significant set of samples to estimate the distribution of temporary stop events during a trip.

Figure 5:
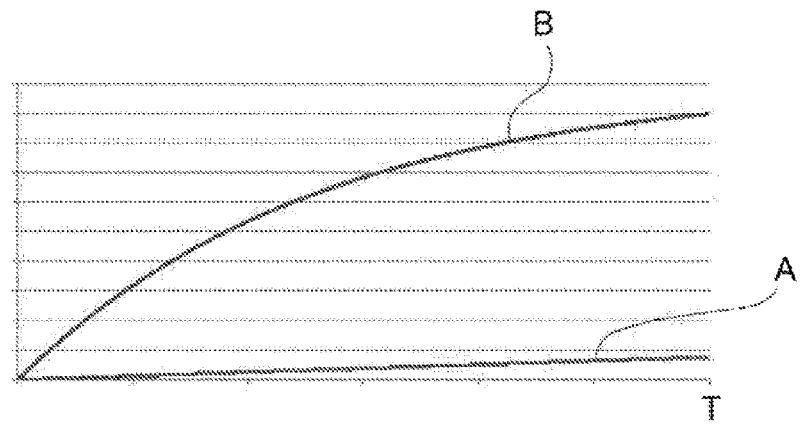
FIGS. 5, 6 and 7 are graphs representative of the probabilities of events on the basis of the optimization of the determination of the travel time according to the present invention.

Using the optimization techniques of interpolation of statistical distributions, the probability functions Pr(t<T|s=final) and Pr(t<T|s=temporary) are determined for hysteresis time interval T values between 0 and a predetermined upper limit. These are shown in FIG. 5. Curve A shows that the probability that a definitive stop event will last less than the predetermined upper limit of the hysteresis interval is very low, essentially between 2% and 8% based on experimental data obtained by the inventors. Curve B shows that the probability that a temporary stop event will last less than the predetermined upper limit of the hysteresis interval is very high, substantially above 30% for relatively small hysteresis time interval values and reaching 90% for higher values of the hysteresis time interval.

Figure 6:
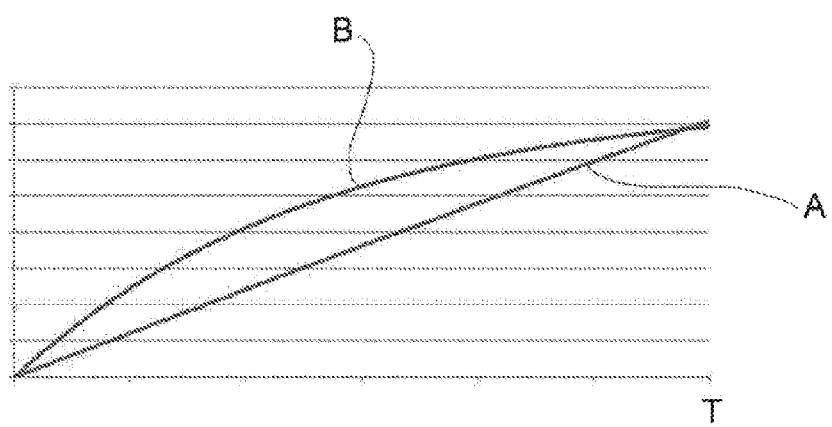

From the same data are derived the corresponding joint probabilities Pr (s=final, t<T) and Pr (s=temporary, t<T), these same also determined for values of the hysteresis time interval T between 0 and said predetermined upper limit, shown in FIG. 6.

By way of example, FIG. 6 shows with curve A the probability that a stop event will last less than the predetermined upper limit of the hysteresis time interval and that it is a definitive stop event. For example, based on experimental data obtained by the inventors such probability is about 3.6%. FIG. 6 also shows with curve B the probability that a stop event will last less than the predetermined upper limit of the hysteresis time interval and that it will be a temporary stop event. For example, such probability is approximately 5.3% based on experimental data obtained by the inventors.

Figure 7:
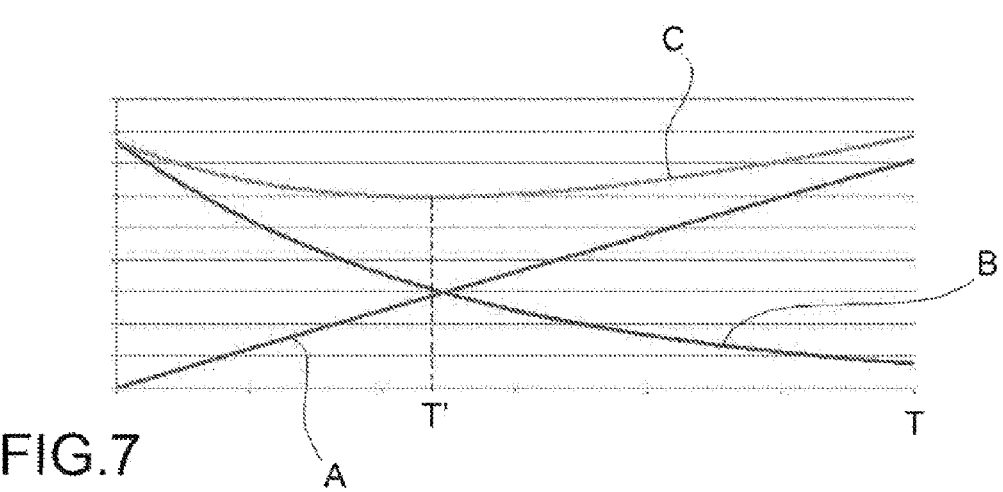

The joint properties allow one to estimate the probability of error $Pr(E_b, T)$, $Pr(E_m, T)$ and Pr(E, T), shown in FIG. 7.

FIG. 7 shows that for low values of the hysteresis time interval (tending to zero) the probability of erroneously merging two actual separate trips tends to 0 (curve A), while the probability of erroneously subdividing an actual single trip into two separate trips is high (curve B), as it depends on the fact that each temporary stop determines the interpretation of a subdivision of an actual trip into separate trips if the hysteresis time interval is set to a very low value.

On the other hand, a high value of the hysteresis time interval would result in the recognition of a smaller number of subdivisions of individual actual trips (for example, less than 1% for a hysteresis time interval based on experimental data obtained by the inventors), however, the number of actual separate trips erroneously merged into a single trip would be relatively high.

The total error probability is shown in FIG. 7 by curve C, which considers both errors. The minimum value of this curve allows one to determine the optimal hysteresis time interval, indicated by T' in the figure. The same corresponds, for example, to an optimal time interval, which entails a minimum error probability.

Curve C of FIG. 7 is a significant indication for configuring the optimal hysteresis time interval in a method for determining the travel time of a vehicle based on the use of an onboard device adapted to indirectly determine the state of a vehicle, for example based on an analysis of the voltage value that is established across an accumulator assembly of the vehicle, an analysis of vehicle dynamics data detected by accelerometer and/or gyroscopic sensors, or an analysis of positioning data acquired by a geographical positioning system of the vehicle.

When the importance of an error in recognizing separate trips in the case of an actual single trip is the same as the importance of an error in recognizing a single trip in the case of actual separate trips, a hysteresis time interval value corresponding to the minimum of the probability curve that an actual single trip is subdivided in a plurality of (two)

separate trips and that a plurality of (two) actual separate trips is merged into a single trip is an optimal hysteresis interval value.

When, by virtue of the intended purpose of recognizing a trip, the importance of an error relating to the subdivision of an actual single trip is greater than the importance of an error concerning the merging of actual separate trips, then the hysteresis time interval may be increased at the expense of a greater probability of an error in merging actual separate trips. Conversely, when the importance of an error in the merging of actual separate trips is greater than the importance of an error in the subdivision of an actual single trip, the hysteresis time interval may be reduced at the expense of a higher probability of an error in subdividing individual actual trips.

It is worth noting that in the implementation of a method for estimating the travel time of a vehicle of the present invention, the application of a hysteresis time interval does not necessarily occur by an onboard device for detecting data relating to the motion and driving parameters of a vehicle. In an alternative embodiment, the onboard device may be programmed to apply a very short hysteresis time interval, near or equal to zero, and a hysteresis time interval may be applied to data processing that occurs at the central remote unit. This possibility provides operational flexibility over having a hysteresis time interval set in an onboard device, since it allows said hysteresis time interval to be modified according to the intended use of a specific onboard device or of the vehicle on which a device is installed, for example, as a function of the individual vehicle, its driver and possibly even over the time.

Naturally, without altering the principle of the invention, the embodiments and the details of implementation may vary widely with respect to what is described and illustrated purely by way of non-limiting example, without thereby departing from the scope of protection of the invention defined by the appended claims.

The invention claimed is:

1. A method for estimating the travel time of a vehicle based on the determination of the state of the vehicle, comprising:
    recognizing an event of start of travel as a result of the determination of a transition from an inactive engine state or vehicle-at-rest state to an active engine state or running vehicle state;
    recognizing an event of end of travel as a result of the determination of a transition from an active engine state or running vehicle state to an inactive engine state or vehicle-at-rest state; and
    calculating the duration of the travel according to the time elapsed between said recognized event of start of travel and said recognized event of end of travel, wherein
    a transition from an inactive engine state or a vehicle-at-rest state to an active engine state or running vehicle state is determined if the active engine state or running vehicle state is maintained unchanged for a predetermined first hysteresis time interval;
    a transition from an active engine state or a running vehicle state to an inactive engine state or a vehicle-at-rest state is determined if the inactive engine state or vehicle-at-rest state is maintained unchanged for a predetermined second hysteresis time interval; and
    an optimal hysteresis time interval is determined as the minimum of a curve of error probability that an actual single trip be divided into two or more separate trips as a consequence of the vehicle stop, and that two or more actual separate trips as a result of the vehicle stop be merged in a single trip, as a function of a predetermined first and second hysteresis time interval.

2. The method according to claim 1, wherein said first and second hysteresis time interval have identical values.

3. The method according to claim 1, wherein said curve of error probability is calculated on the basis of a set of travel data of a plurality of vehicles, for a predetermined number of total trips made, wherein said travel data are representative of the duration of the trips made by the vehicles and of the duration of temporary and permanent stop intervals associated to said trips.

4. The method according to claim 3, wherein said travel data relating to a vehicle are acquired by an onboard device for detecting data related to motion and driving parameters of the vehicle associated with an ignition and key start switch device of the vehicle.

5. The method according to claim 1, wherein the determination of the state of the vehicle is performed by means of an onboard device adapted to determine the state of a vehicle on the basis of an analysis of a voltage value that is established across an electric charge accumulator assembly of the vehicle.

6. The method according to claim 1, wherein the determination of the state of the vehicle is performed by an onboard device adapted to determine the state of a vehicle based on an analysis of vehicle dynamics data detected by accelerometer and/or gyroscopic sensors.

7. The method according to claim 1, wherein the determination of the state of the vehicle is performed by an onboard device adapted to determine the state of a vehicle on the basis of an analysis of positioning data acquired from a geographical positioning system of the vehicle.

8. An onboard device for detecting data related to motion and driving parameters of a vehicle, comprising a processing system for estimating the travel time of a vehicle, programmed for implementing a method according to claim 1.

9. A non-transitory computer readable medium storing a computer program or group of programs executable by a processing system of an onboard device for detecting data relating to motion and driving parameters of a vehicle, comprising one or more code modules for the implementation of a method for estimating the travel time of a vehicle according to claim 1.

* * * * *